United States Patent [19]
Hashimoto

[11] Patent Number: 5,838,459
[45] Date of Patent: Nov. 17, 1998

[54] FACSIMILE AUTOMATIC DELIVERY SYSTEM

[75] Inventor: Kazuhiro Hashimoto, Kawasaki, Japan

[73] Assignee: Fuji Xerox Co., Ltd., Tokyo, Japan

[21] Appl. No.: 700,127

[22] Filed: Aug. 20, 1996

Related U.S. Application Data

[63] Continuation-in-part of Ser. No. 378,608, Jan. 26, 1995, abandoned.

[30] Foreign Application Priority Data

Feb. 3, 1994 [JP] Japan ................... 6-031962

[51] Int. Cl.$^6$ ........................................ H04N 1/00
[52] U.S. Cl. .................. 358/402; 358/403; 358/434; 358/440; 358/468
[58] Field of Search .................. 358/400, 402, 358/403, 405, 434, 436, 437, 440, 444, 468; 379/100

[56] References Cited

U.S. PATENT DOCUMENTS

| 4,646,160 | 2/1987 | Iizuka et al. ........... 358/402 |
| 5,134,501 | 7/1992 | Satomi et al. . | |
| 5,392,131 | 2/1995 | Umeno ........... 358/403 |

FOREIGN PATENT DOCUMENTS

| 0 514 035 A1 | 11/1992 | European Pat. Off. . |
| 1-318338 | 12/1989 | Japan . |
| 4-65774 | 3/1992 | Japan . |

OTHER PUBLICATIONS

Japanese Patent Abstracts (Application No. JP–90 0209945) vol. 16, No. 322 (E–1233) dated Jul. 14, 1992.
Japanese Patent Abstracts (Application No. JP–88 0149747) vol. 14, No. 125 (E–0900) dated Mar. 3, 1990.
Japanese Patent Abstracts (Application No. JP–90 0177231) vol. 16, No. 264 (P–1370) dated Jun. 15, 1992.

*Primary Examiner*—Thomas D. Lee
*Attorney, Agent, or Firm*—Finnegan, Henderson, Farabow, Garrett & Dunner, L.L.P.

[57] ABSTRACT

A facsimile automatic delivery system which delivers documents which are managed in a hierarchical structure, by using a facsimile device to destinations indicated in a destination list. A transmission management editing unit produces and manages transmission management information in which transmission results such as transmission completion and transmission incompletion are managed in accordance with the destination list and in the hierarchical structure. A retrieval unit retrieves a document to be transmitted from a filing device, on the basis of the transmission management information supplied from the transmission management editing unit. A data conversion unit converts the document which is to be transmitted and obtained as a result of the retrieval, into a form which can be facsimiled. A facsimile transmission unit transmits the converted data to a destination indicated in the destination list. In accordance with completion or incompletion of the facsimile transmission, transmission results of the transmission management information are updated. On the basis of the updated transmission management information, a document which is to be transmitted but has been transmitted incompletely is retransmitted to the corresponding destination.

3 Claims, 13 Drawing Sheets

FIG. 4

TRANSMISSION LOG FILE FOR DESTINATION 0

| IDENTIFIER | STATE | ERROR INFORMATION |
|---|---|---|
| ....... | | |
| Ni | DONE | |
| ....... | | |
| Yj | FAILED | |

⋮

TRANSMISSION LOG FILE FOR DESTINATION (RMAX-1)

| IDENTIFIER | STATE | ERROR INFORMATION |
|---|---|---|
| ....... | | |
| Ni | FAILED | |
| ....... | | |
| Yj | DONE | |

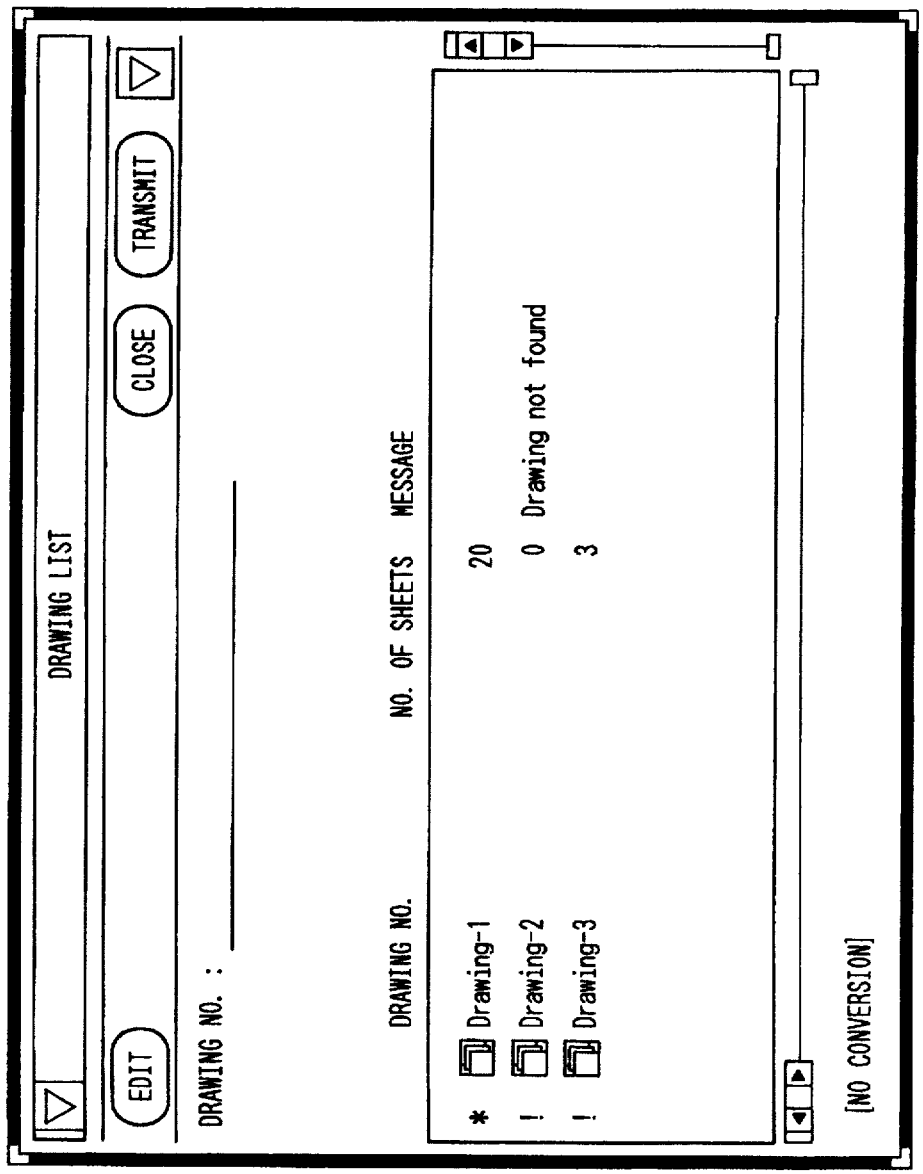

FACSIMILE AUTOMATIC DELIVERY SYSTEM

This application is a continuation-in-part of application Ser. No. 08/378,608, filed Jan. 26, 1995, now abandoned.

BACKGROUND OF THE INVENTION

The invention relates to a system which automatically delivers by using a facsimile device a document particularly a drawing, stored in storage means to a designated destination.

In an environment wherein a host computer, a filing device, and a facsimile device are connected to a network such as a local area network (LAN), a system has been proposed in which a document stored in the filing device, such as a drawing sheet is retrieved by the host computer, the image data of the sheet are converted into a form which can be facsimiled and then transferred to the facsimile device, and the data are transmitted from the facsimile device to another facsimile device at a remote place (as disclosed, for example, in Japanese Patent Unexamined Publication No. Hei. 4-65774). In this disclosure, it is assumed that a digital image obtained by reading one drawing original with use of a scanner or the like corresponds to one sheet.

In such a system, a transmission of a drawing from a facsimile device may be completed or it may be incompletely ended when the destination facsimile device is busy or a transmission error occurs. Transmission results indicative of completion or incompletion for each drawing sheet to be transmitted are transferred from the facsimile device to the host computer. The transmission results are displayed by the in the form of a list on a terminal device such as a display device. Hereinafter, a sheet which has been incompletely transmitted is referred to as "incomplete transmission sheet".

Regarding an incomplete transmission drawing sheet, the operator checks the displayed list of transmission results to confirm a drawing sheet which must be retransmitted, and retransmission of this drawing sheet is manually conducted.

In a communication information management device disclosed in Japanese Patent Unexamined Publication No. Hei. 1-318338, transmission management information, comprising of data to be transmitted, is stored while being separated into that of data designated to be held in transmission and that of other data. Communication data which are held in transmission are displayed as a list, thereby improving the workability of transmission operations conducted by the operator.

When an M number of drawing sheets are transmitted to an N number of destinations, an M×N number of transmission results are produced, and incomplete transmission drawing sheets may be different for each destination. As the number of the drawing sheets and/or destinations becomes larger, therefore, it becomes more cumbersome to conduct manual confirmation of retransmission.

Incidentally, in the case where drawings are to be automatically facsimiled, the drawings may be managed in a hierarchical structure in such a manner that plural drawing sheets are made into one drawing bundle. This produces various advantages as described below.

In a filing device wherein hierarchical management is employed, as shown in FIG. 15, one drawing sheet bundle (hereinafter, referred to as merely "drawing bundle") includes one or more drawing sheets (hereinafter, a drawing sheet is referred to merely as a "sheet"). Drawing bundles are identified by drawing bundle numbers (in FIG. 15, indicated as #M (M=1, 2, . . . )), and sheets by sheet numbers #1, #2, . . . , #N. A drawing can be retrieved from the filing device with use of a drawing bundle number as a keyword.

A drawing to be transmitted can be designated by a drawing bundle number and a sheet number. Since drawings are managed in a hierarchical structure, in the case where all sheets of one drawing bundle are to be transmitted to one or more destinations, the operator is required only to designate the drawing bundle number of the drawing bundle. In this case, consequently, it is not necessary to set the sheets to each of the destinations, thereby facilitating the process of designating drawings to be transmitted.

When a predetermined drawing bundle must be transmitted periodically to a specific destination, one of the drawing bundle numbers may be preset to be transmitted to or to be the transmission object for the specific destination. Under this state, even when a part or the whole of the sheets constituting the drawing bundle of the preset drawing bundle number is subjected to update, addition, or change, the operator is not required to change the designation of drawings to be transmitted to the destination. This is very convenient for the operator.

Where facsimiled transmission of drawings is managed in such a hierarchical structure i.e., when the same drawing bundle is facsimiled to plural destinations as described above, transmission results indicative of completion or incompletion of transmission may be different for each sheet and for each destination. In order to retransmit sheets which have failed to be transmitted, therefore, the operator must manually select such sheets. This requires cumbersome work.

SUMMARY OF THE INVENTION

It is an object of the invention to provide a system wherein, even in the case where documents such as drawings are managed in a hierarchical structure such as that described above, an incomplete transmission document which exists in the lowest hierarchy level of a transmission object can be selected automatically, and rapidly retransmitted by a simple operation.

In order to attain the above object, the invention provides a facsimile automatic delivery system which delivers documents by using a facsimile device to destinations indicated in a destination list, the documents being managed in a hierarchical structure, the system including: storage means for storing the documents; transmission management means for producing and managing transmission management information in accordance with the destination list, the transmission management information being managed in the hierarchical structure; retrieval means for retrieving a document to be transmitted, from the storage means on the basis of the transmission management information supplied from the transmission management means; data conversion means for converting data of the document to be transmitted, the document being retrieved by the retrieval means, into a form which can be facsimiled; facsimile transmission means for transmitting data which have been converted by the data conversion means, to a destination indicated in the destination list; transmission history production means for producing a transmission history, in accordance with completion and incompletion of transmission conducted by the facsimile transmission means, the transmission history being included in the transmission management information; and retransmission means for retransmitting a transmission object which has been incompletely transmitted, to a corresponding destination, on the basis of the transmission management information including the transmission history.

BRIEF DESCRIPTION OF THE DRAWINGS

FIG. 4 is a diagram illustrating a transmission log file used in the embodiment of the invention;

FIGS. 13(A) and 13(B) are diagrams showing operation screens used in the embodiment of the invention;

DETAILED DESCRIPTION OF THE PREFERRED EMBODIMENT

Hereinafter, an embodiment of the facsimile automatic delivery system according to the invention will be described with reference to FIGS. 1 to 14. In the automatic delivery system of the embodiment, documents to be transmitted are drawings. For example, the drawings to be transmitted are stored and managed in a hierarchical structure in a filing device as described in conjunction with FIG. 15.

Figure 1:
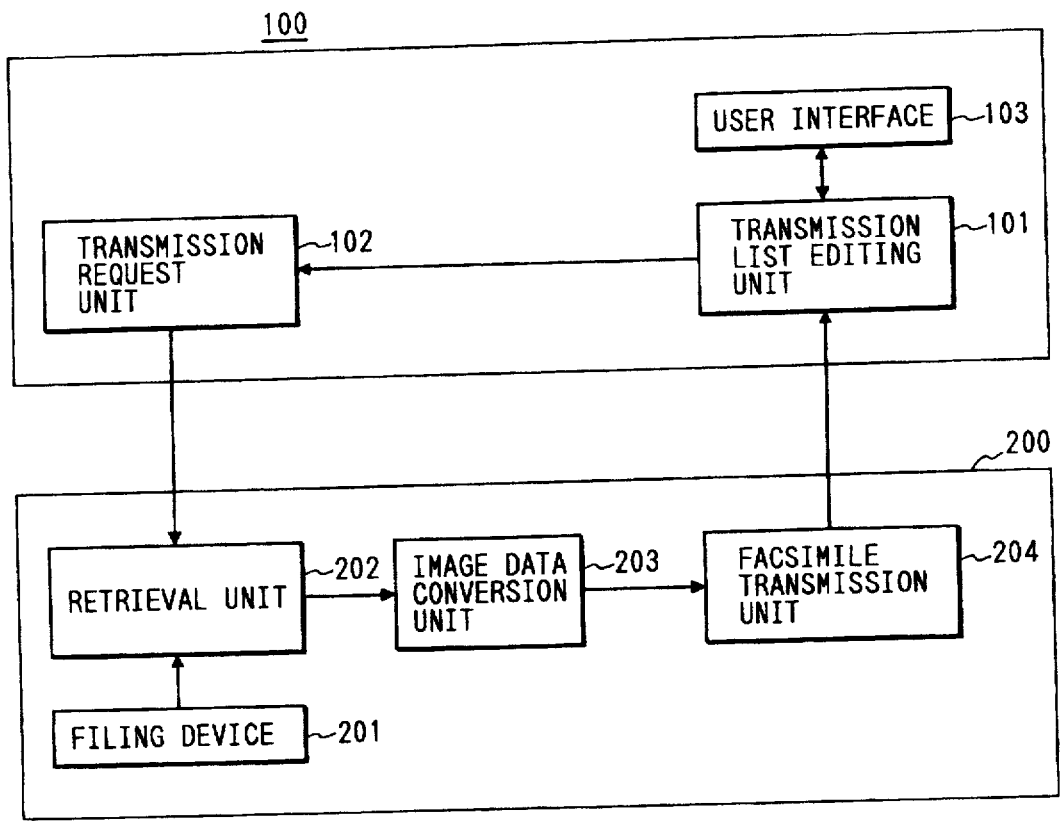
FIG. 1 is a block diagram showing an example of the principal configuration of a facsimile automatic delivery system according to the invention.

FIG. 1 is a diagram showing the principal configuration of the facsimile automatic delivery system according to the invention. Reference numeral 100 designates a transmission management editing unit, and 200 designates a delivery execution unit. The facsimile automatic delivery system according to the invention can be realized by a workstation and the like. FIG. 1 is a functional block diagram showing functional portions which are executed by a computer.

The transmission management editing unit 100 edits a list of drawing bundles and sheets which are to be transmitted, and instructs the delivery execution unit 200 to start the transmission operation. The unit 100 includes a transmission list editing unit 101, a transmission request unit 102, and a user interface 103 which consists of an input operation unit, a display device and the like.

The delivery execution unit 200 includes: a filing device 201 in which drawings are stored in a hierarchical structure; a retrieval unit 202 which retrieves a drawing from the filing device 201 under given retrieval conditions; an image data conversion unit 203 which converts a drawing (sheet) obtained as a result of a retrieval into a data form which can be facsimiled; and a facsimile transmission unit 204 which executes facsimile transmission.

Figure 15:
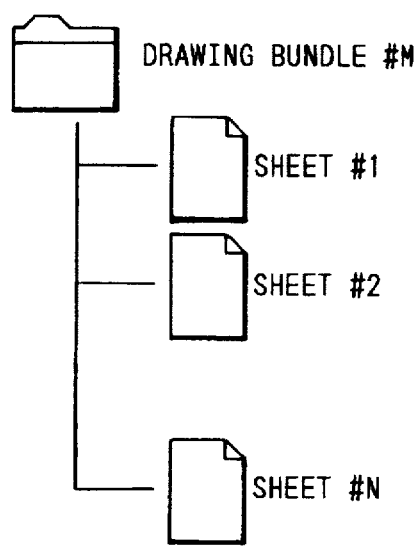
FIG. 15 is a diagram illustrating a hierarchical structure of a document file.

In the embodiment, as described above, the filing device stores and manages drawings in a hierarchical structure. In other words, as shown in FIG. 15, each drawing bundle may include plural sheets. Drawing bundles are identified by drawing bundle numbers, and sheets by sheet numbers.

The transmission list editing unit 101 of the transmission management editing unit 100 initially produces and stores a drawing list including a list of drawing bundles and sheets which are designated as a transmission object by an input operation conducted by the operator on the user interface 103. The drawing list further includes destination information. At this time, identifiers for drawing bundles and sheets of the transmission object are added.

In order to conduct retransmission, the transmission list editing unit 101 receives from the delivery execution unit 200 a drawing list which is updated as a result of facsimile transmission of drawings executed by the delivery execution unit 200 as described later. Editing operations such as addition, change, and deletion of destinations, drawing bundles, and sheets can be done also on the updated drawing list through the user interface 103. The edited drawing list is stored.

The contents of the drawing list can be displayed on a screen of the user interface 103 so that the operator confirms them. While viewing the display, the operator conducts the input and editing operations. The contents of a drawing list are selectively displayed in a manner conforming to the employed hierarchical structure, or in the unit of a drawing bundle or a sheet.

When a transmission start instruction is given by the operator through the user interface 103, the transmission request unit 102 of the transmission management editing unit 100 scans the drawing list supplied from the transmission list editing unit 101. If there is an incomplete transmission drawing bundle or sheet which has not yet been completely transmitted, the transmission request unit 102 actuates the delivery execution unit 200 so that the incomplete transmission drawing bundle or sheet is retransmitted. In practice, a "REQUEST" for actuating transmission with setting the incomplete transmission drawing bundle or sheet to be a transmission object is added to each of the drawing bundles or sheets, and the drawing list is then transferred to the delivery execution unit 200. The drawing list to which the transmission history (transmission log information) obtained up to this time is added and transferred to the delivery execution unit 200.

The retrieval unit 202 of the delivery execution unit 200 is actuated in accordance with the drawing list transferred from the transmission request unit 102, and retrieves the drawing bundles and sheets of the transmission object transferred from the filing device 201, to fetch image data of sheets of the transmission object. As described above, a drawing can be retrieved from the filing device 201 with use of the identifier of a drawing bundle as a keyword. In the case where a sheet is designated by the operator, the retrieval unit 202 further retrieves the sheet.

The image data conversion unit 203 converts captured image data of the sheets into data which can be facsimiled, and then stores them.

The facsimile transmission unit 204 facsimiles the data produced by the image data conversion unit 203 through a telephone circuit to plural destinations which are indicated in the drawing list. In the facsimile transmission, the facsimile transmission unit 204 obtains transmission results, or judges whether transmission of each sheet of the transmission object is completed or caused to be incompletely ended because the destination device is busy or a transmission error occurs. The transmission results (log information) are registered in a transmission log file for each of the destinations. For each of the destinations, the above-mentioned processes are repeatedly conducted on all of the incomplete transmission sheets of the transmission object. In the initial transmission, it is assumed that all sheets are incompletely transmitted, and hence all sheets are facsimiled.

At the same time the transmission results are written into the transmission log file, the facsimile transmission unit 204 records the transmission completion of drawing bundles and sheets in the drawing list which have been completely transmitted, into the file.

The drawing list to which a new transmission history obtained at the end of transmission of all the incomplete transmission sheets is added is input together with the transmission log file to the transmission list editing unit 101 of the transmission management editing unit 100, so that a drawing bundle or sheet which has not been transmitted completely in this transmission process is retransmitted in the next transmission process. The drawing list and the transmission log file constitute the transmission management information.

Figure 2:
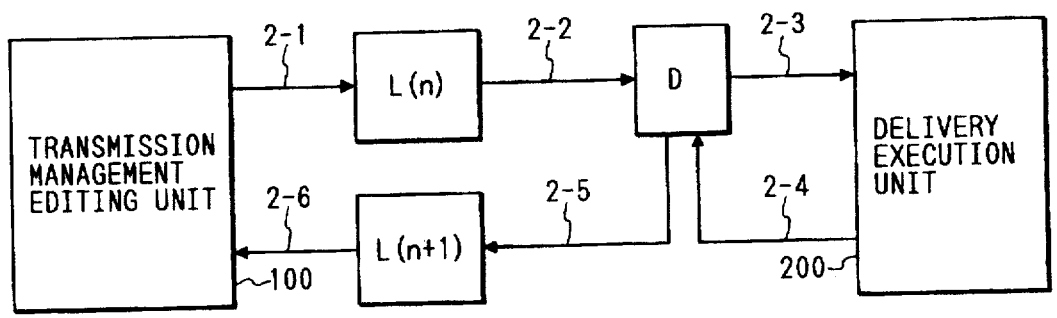
FIG. 2 is a diagram illustrating a method of producing a transmission history in the exemplary facsimile automatic delivery system of FIG. 1 according to the invention.

FIG. 2 is a diagram illustrating a repeated operation wherein the drawing list, to which the transmission history is added, is output from the transmission list editing unit 101 of the transmission management editing unit 100 so as to be input again to the transmission list editing unit 101 through the facsimile transmission unit 204 of the delivery execution unit 200. The repeated operation allows retransmission to be repeatedly conducted so that incomplete transmission sheets are gradually decreased in number.

In FIG. 2, L(n) indicates a drawing list which is produced in an n-th (n=0, 1, 2, . . . ) transmission. L(0) indicates a drawing list which is initially prepared by the operator and in which all drawing bundles and sheets are indicated as not-yet-transmitted. In the drawing list L(0), there is no data of transmission results. In a drawing list L(n) (n≧1), log data of transmission results obtained after facsimile transmission are annexed. In the specification, for the sake of convenience, a drawing list L(n) to which data of transmission results are annexed is called an n-th transmission history.

As described above, the transmission management editing unit 100 produces the first drawing list L(0) in response to an input operation of the operator (step 2-1), and transfers the list to the delivery execution unit 200 (step 2-2). The transferred drawing list L(0) is stored as local data D of the delivery execution unit 200.

Every time each sheet is transmitted to each destination, the delivery execution unit 200 adds results of the transmission to the data D (steps 2-3 and 2-4). Transmission of all incomplete transmission sheets is ended, the data D is transferred as the first transmission history L(1) to the transmission management editing unit 100 (step 2-5).

The transmission management editing unit 100 scans the first transmission history L(1) (step 2-6). If there is an incomplete transmission sheet, the first transmission history L(1) is transferred to the delivery execution unit 200 through steps 2-1 and 2-2, and then executes the retransmission process. This is repeated in the following.

As seen from the method of producing an n-th transmission history L(n), when the portion of sheets indicated by the n-th transmission history L(n) which failed to be transmitted is indicated by L*(n), the following relationships hold:

L*(0)⊃L*(1)⊃. . . L*(n-1)⊃L*(n)⊃. . .

When steps 2-1 to 2-6 are repeated, therefore, the number of sheets which must be retransmitted is gradually decreased.

In the above, the principal configuration of an embodiment of the invention has been described. The embodiment will be described more specifically.

Figure 3:
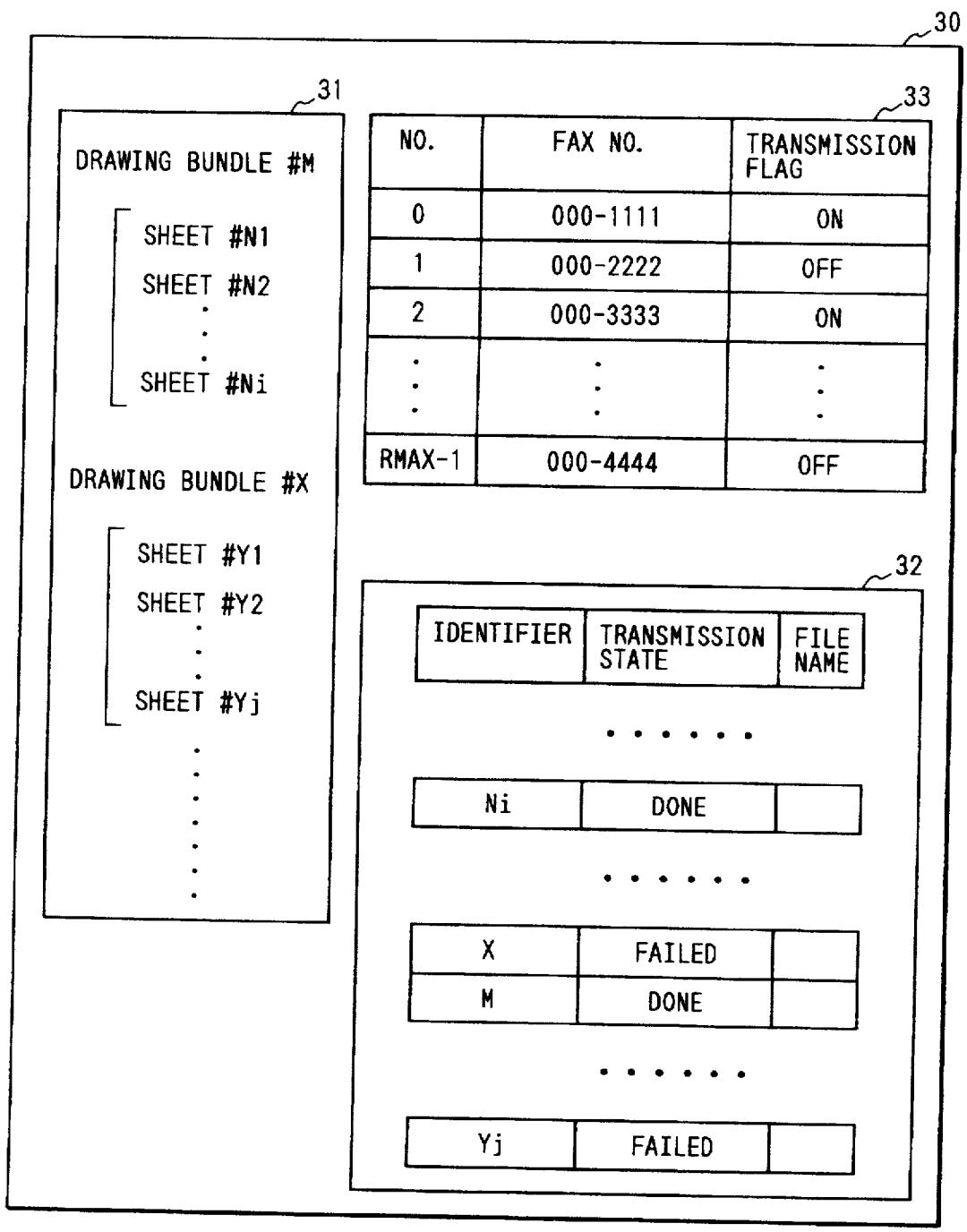
FIG. 3 is a diagram illustrating a drawing list used in an embodiment of the invention.

FIG. 3 shows an example of the drawing list used in the embodiment. In the example, the drawing list 30 consists of configuration information 31, an object list 32, and a destination list 33.

The configuration information 31 is information which indicates the configuration of drawings (drawing bundles and sheets) which are designated by the operator to be transmitted. When no sheet is designated, it is assumed that all sheets included in the designated drawing bundles are designated to be transmitted. In FIG. 3, a character or a combination of a character and a numeral which is placed in the right side of a symbol # is an identifier of a drawing bundle or a sheet. The identifiers are allocated by the transmission list editing unit 101 to the drawing bundles and the sheets, respectively. An identifier of a drawing bundle is different in configuration from that of a sheet, and therefore they are distinguishable from each other.

The object list 32 is a list in which one record is formed for each of the identifiers of the drawing bundles and the sheets. Each record has a field of a transmission state, and a field of a file name. A result of facsimile transmission is recorded in the transmission state field. In FIG. 3, "DONE" indicating completion of transmission, and "FAILED" indicating incompletion of transmission are shown as examples of a result recorded in the transmission state field. When all sheets of a drawing bundle have been transmitted completely, the transmission state of this drawing bundle is judged as "DONE".

Initially, identifiers of drawing bundles and sheets are set to be negative.

In the destination list 33, records are produced which contain information of destinations or have a facsimile number (telephone number) and a transmission flag for each of the destinations. When the operator designates destinations of a maximum number of RMAX, an RMAX number of records are produced. When all sheets for the corresponding destination have completely been transmitted, the transmission flag is set to be "OFF", and, when there is an incomplete transmission sheet, the transmission flag to be "ON".

FIG. 4 shows an example of the configuration of the transmission log file in which transmission results are recorded. As illustrated, the transmission log file is produced for each destination. The record of the transmission log file for a destination R (R=0, 1, 2, . . . , (RMAX-1)) is produced for each sheet identifier, and not produced for a drawing bundle. The record for each sheet identifier has a field of a transmission state, and a field of error information. In the transmission state field, a transmission result of a sheet having an identifier for the destination is recorded, and, in the error information field, information of an error which has caused an incomplete transmission state is recorded.

Next, specific examples of the operations of the transmission management editing unit 100 and delivery execution unit 200 in the case where drawings are delivered will be described with reference to the above-mentioned drawing list and transmission log file.

Figure 5:
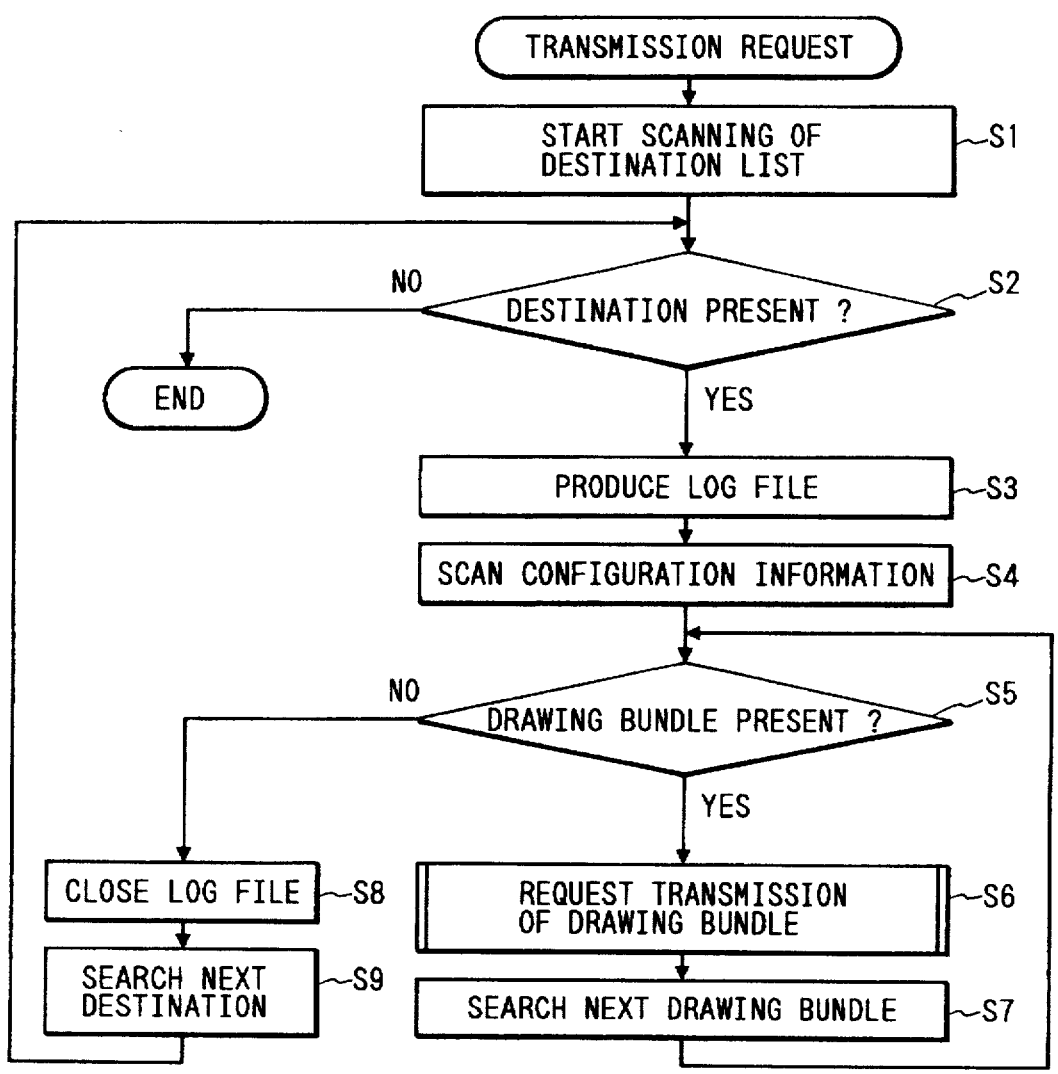
FIG. 5 is a flowchart of an example of the operation of a transmission management editing unit used in the example of FIG. 1.
Figure 6:
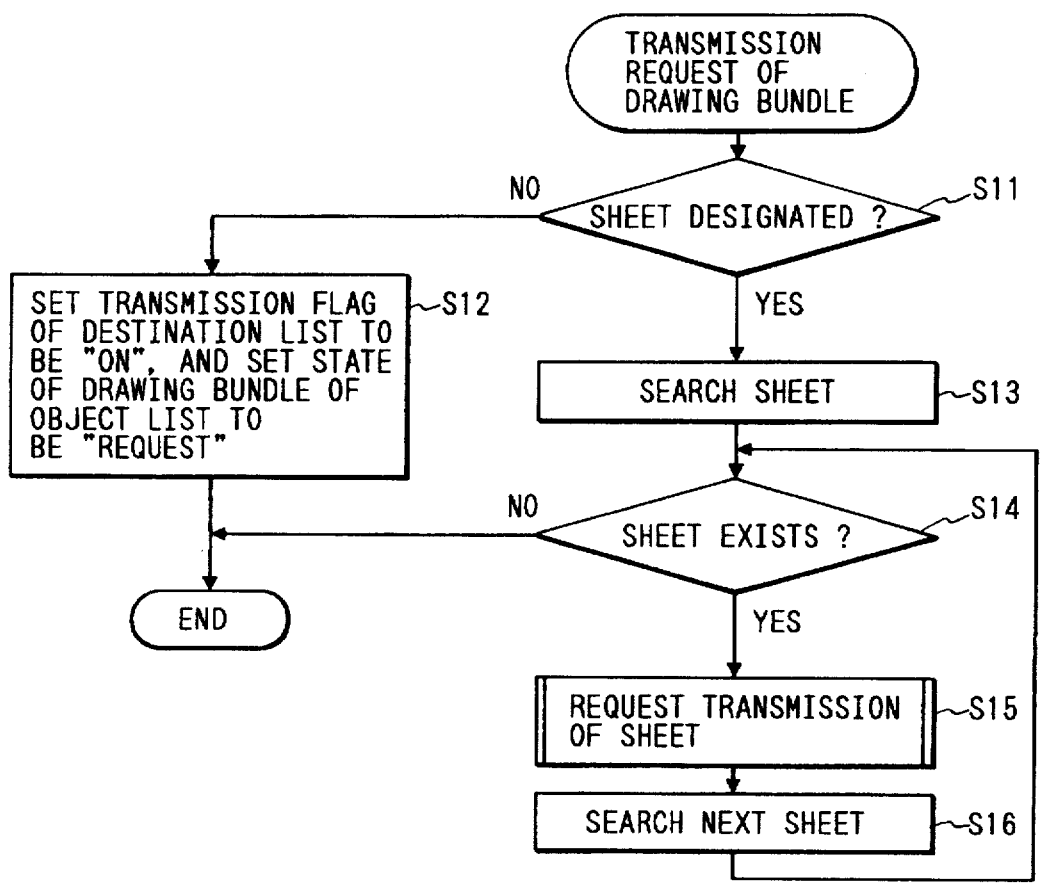
FIG. 6 is a flowchart of a routine in FIG. 5.
Figure 7:
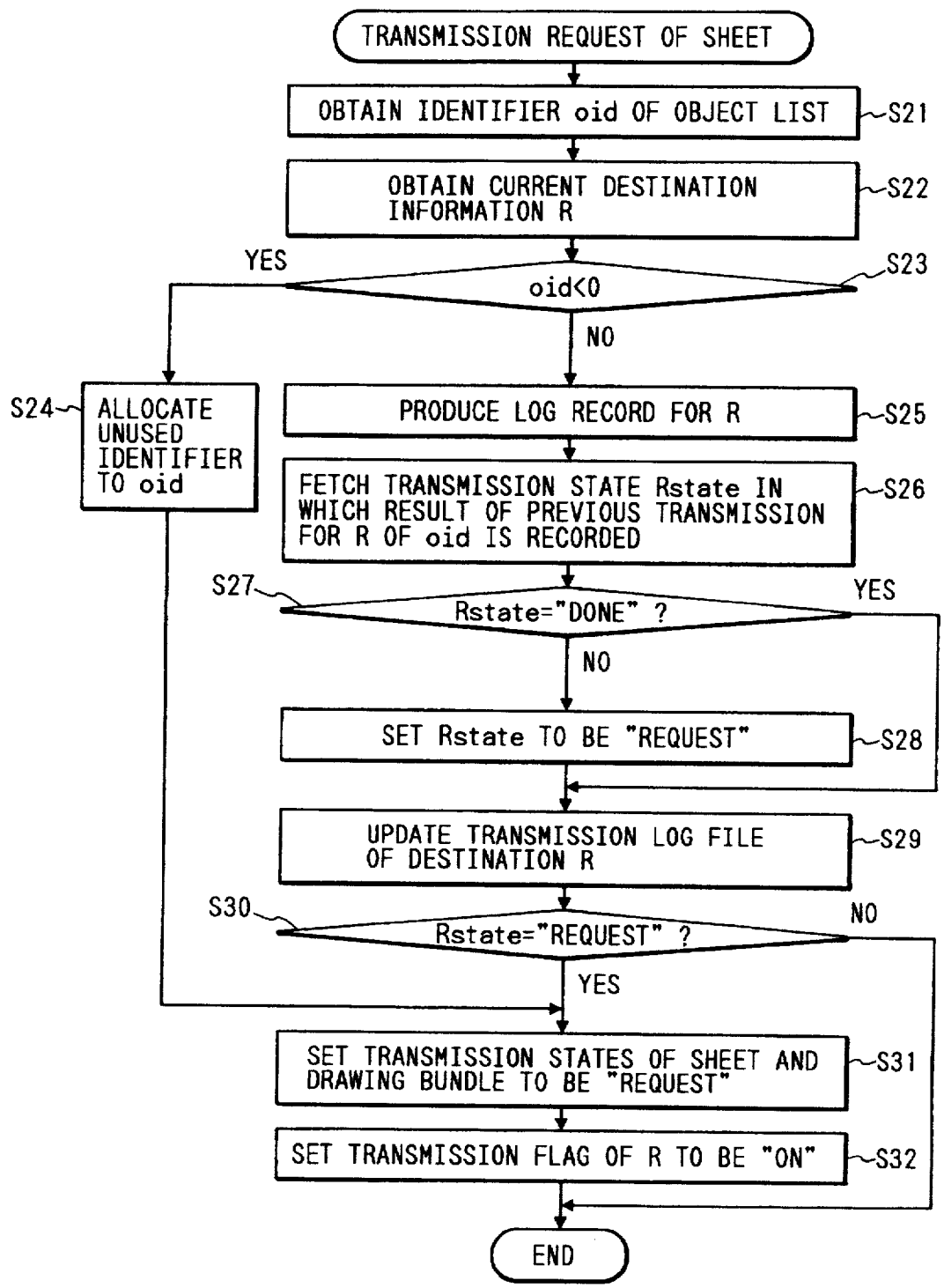
FIG. 7 is a flowchart of a routine in FIG. 6.

FIGS. 5 to 7 show flowcharts of the operations of the transmission request unit 102 of the transmission management editing unit 100. When a transmission start instruction is given by the operator through the user interface 103, the instruction is supplied to the transmission request unit 102 through the transmission list editing unit 101. In response to the instruction, the transmission request unit 102 actuates a transmission request process shown in FIG. 5.

In the transmission request process, first, the scanning of the destination list of the drawing list is started (step S1), and it is judged whether there is a destination or not (step S2). If there is a destination, the transmission log file shown in FIG. 4 is produced for the destination (step S3). Next, the configuration information of the drawing list is scanned (step S4), and it is judged whether there is a drawing bundle or not (step S5). If there is a drawing bundle, the process enters a routine of requesting transmission of the drawing bundle (step S6). This routine is shown in FIG. 6, and will be described later.

Then it is judged whether there is a further drawing bundle or not (steps S7 and S5). If there is a drawing bundle, the drawing bundle transmission request routine of step 6 is conducted on the drawing bundle. If there is no drawing bundle, the transmission log file for the destination is closed (step S8). Next, it is judged whether there is a next destination or not (steps S9 and S2). If there is a next destination, the above-mentioned operations are repeated. If there is no next destination, the transmission request routine is ended.

The drawing bundle transmission request routine shown in FIG. 6 will be described. As described in conjunction with FIG. 5, the drawing bundle transmission request routine is called for each of drawing bundles with respect to each destination.

In the drawing bundle transmission request routine, first, it is judged whether a sheet in the drawing bundle of the transmission object is designated as a transmission object or not (step S11). If no sheet is designated, the transmission flag of the destination in the destination list 33 of the drawing list shown in FIG. 3 is set to be "ON", and the transmission state of the drawing bundle in the object list 32 is set to be "REQUEST" (step S12). Thereafter, the routine is ended.

If a sheet is designated, the sheet is searched to judge whether the sheet exists or not (steps S13 and S14). If the sheet does not exist, the routine is ended.

If the sheet exists, a routine of requesting transmission of the sheet is called (step S15). The sheet transmission request routine is shown in FIG. 7, and will be described later.

When the sheet transmission request routine is ended, it is judged whether there is a next sheet or not (steps S16 and S14). If there is a next sheet, the sheet transmission request routine is called. These operations are conducted on all sheets.

The sheet transmission request routine shown in FIG. 7 will be described. As described in conjunction with FIG. 6, the sheet transmission request routine is called for each of sheets with respect to each destination.

In the sheet transmission request routine, an identifier oid of an object list of a sheet to be transmitted is obtained (step S21), and current destination information R is obtained (step S22). Then, the identifier oid is checked to see whether it is negative or not (step S23).

As described above, in the initial state where no transmission request has been issued, the identifier oid is set to be negative. In the initial state, therefore, the process proceeds from step S23 to step S24 in which an unused identifier is allocated to oid and the transmission states of the sheet and the drawing bundle including the sheet in the object list are set to be "REQUEST" (step S31). The transmission flag of the destination R in the destination list is set to be "ON" and the fact that a sheet to be transmitted exists for the destination R is stored.

In the case where this sheet was subjected to the transmission request process in the past, the identifier oid is positive. In this case, therefore, the process advances from step S23 to step S25 in which, when there is no log record for the destination R, the log record is produced. The transmission state Rstate in which the result of the previous transmission for the destination R of the sheet of the identifier oid is fetched from the transmission log file of the destination R (step S26).

It is judged whether the transmission state Rstate is indicated as transmission completion (="DONE") or not (step S27). If transmission completion, the transmission state Rstate is unchanged. If the transmission state Rstate is not transmission completion, the transmission state Rstate is set to be "REQUEST" (step S28) and the transmission log file of the destination R is updated (step S29).

Then, the process advances to step S30 in which it is judged whether the transmission state Rstate is "REQUEST" or not. If "REQUEST", it is judged that retransmission must be conducted, and the transmission states of the sheet and the drawing bundle including the sheet in the object list are set to be "REQUEST" (step S31). The transmission flag of the destination R in the destination list is set to be "ON", and the routine is ended (step S32). If the transmission state Rstate is not "REQUEST", the routine is ended without conducting a further operation.

In this way, with respect to the drawing list and the transmission log file, the transmission request unit 102 sets the transmission states of incomplete transmission drawing bundles and sheets, to be "REQUEST", and sends them to the delivery execution unit 200. The delivery execution unit 200 conducts the facsimile transmission process on a drawing bundle or sheet having a transmission state of "REQUEST" in the manner described below, and the results are recorded in the transmission log file.

Figure 8:
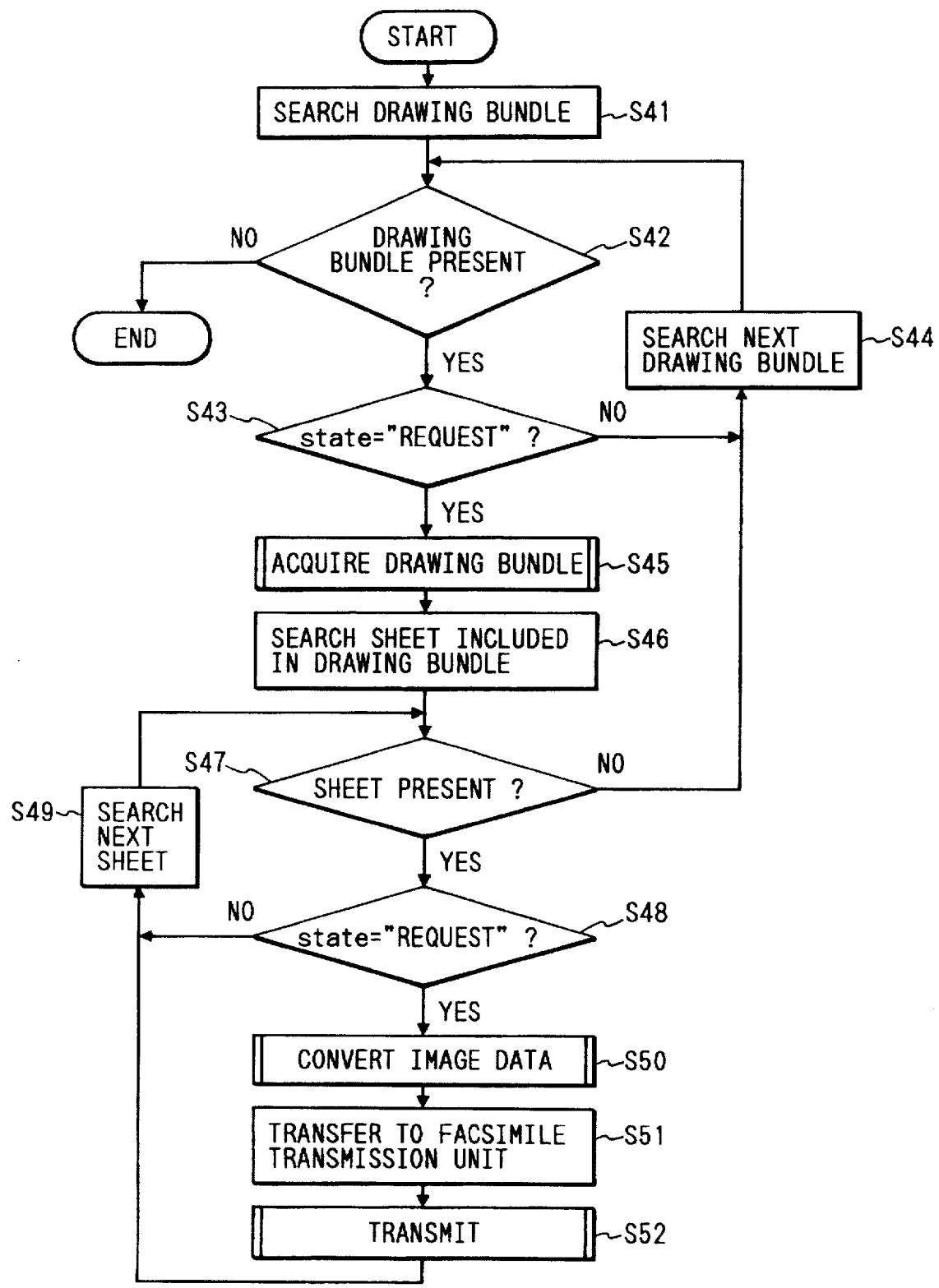
FIG. 8 is a flowchart of an example of the operation of a delivery execution unit used in the example of FIG. 1.

FIG. 8 is a flowchart of the operations of the delivery execution unit 200.

First, the configuration information 31 of the drawing list is scanned (step S41), and it is judged whether there is a drawing bundle or not (step S42). If there is no drawing bundle, this delivery flow is ended. If there is a drawing bundle, a record of the drawing bundle of the identifier is searched from the object list 32 with using the identifier as a keyword. It is judged whether the transmission state is "REQUEST" or not (step S43).

Figure 9:
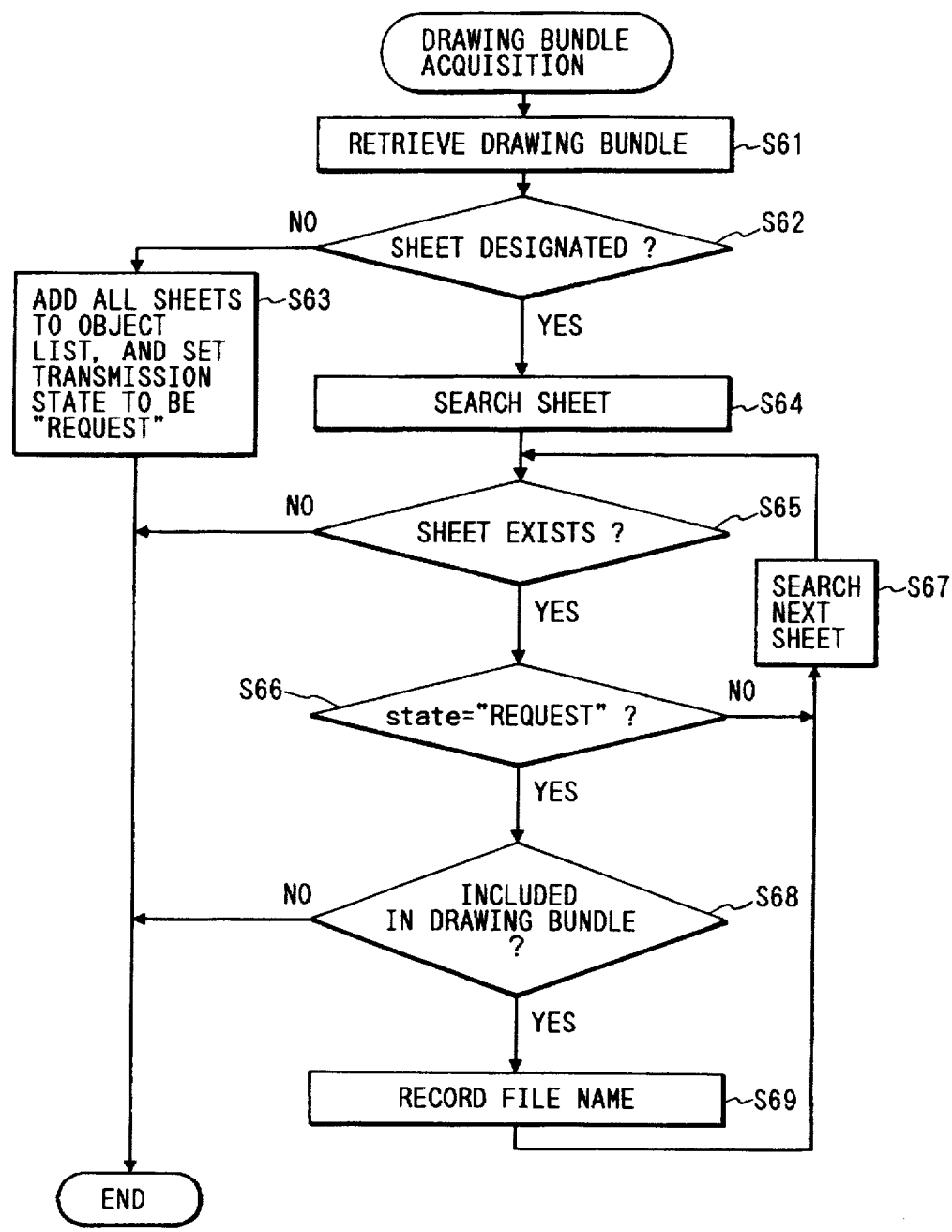
FIG. 9 is a flowchart of an example of the operation of a retrieval unit used in the example of FIG. 1.

If the transmission state is not "REQUEST", a next drawing bundle is searched (steps S44 and S42). If the transmission state is "REQUEST", the process enters a routine which is shown in FIG. 9 and in which the drawing bundle is acquired from the filing device 201 (step S45). The drawing bundle acquisition routine of FIG. 9 will be described later.

When the drawing bundle acquisition routine is ended, a sheet included in the drawing bundle is searched (step S46), and it is judged whether there is a sheet or not (step S47). If the result shows that there is a sheet, the record of the sheet is searched from the object list 32 with using the identifier of the sheet as a keyword, and it is judged whether the transmission state is "REQUEST" or not (step S48).

Figure 10:
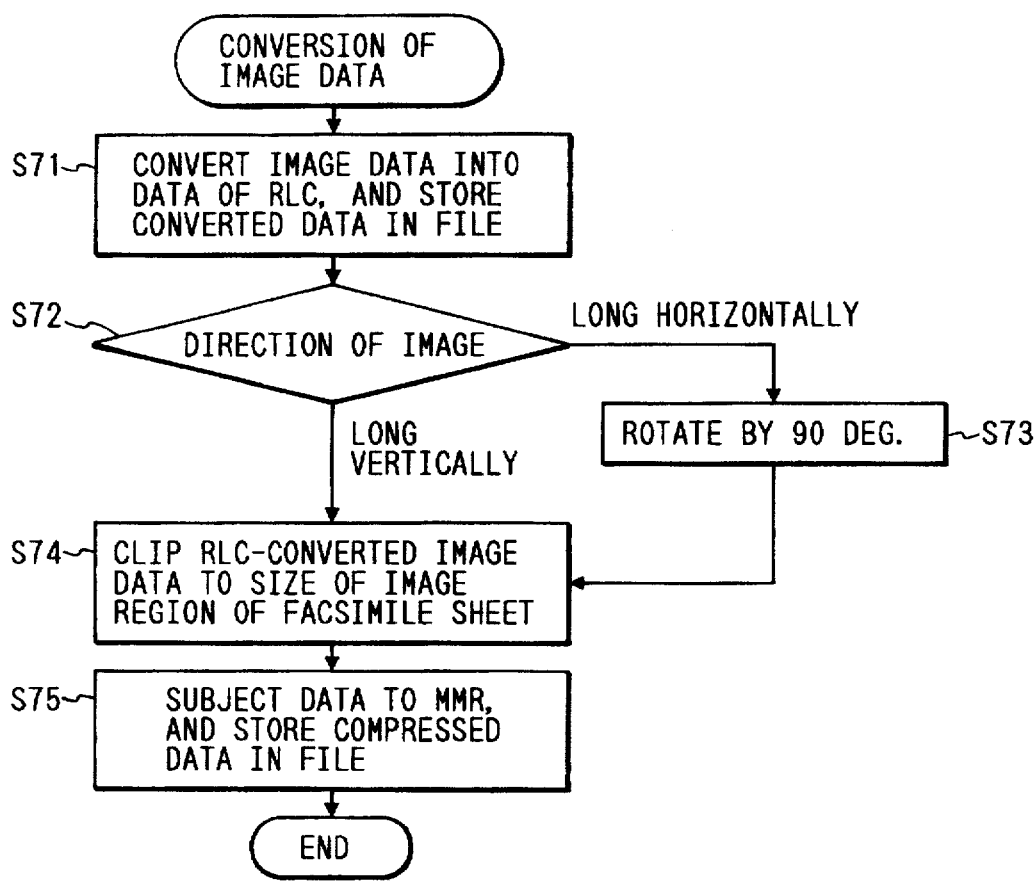
FIG. 10 is a flowchart showing the operation of an image data conversion unit used in the example of FIG. 1.

If the transmission state is not "REQUEST", the process advances to a next sheet (steps S49 and S47). If the transmission state is "REQUEST", the process enters an image data conversion routine which is shown in FIG. 10

(step S50). The image data are converted into data which can be facsimiled. The image data conversion routine of FIG. 10 will be described later.

The image data which have been converted by the image data conversion routine are transferred to the facsimile transmission unit (step S51). Facsimile transmission is conducted in a facsimile transmission routine shown in FIG. 11 (step S52), and a transmission result is recorded. The facsimile transmission routine of FIG. 11 will be described later.

When transmission of one sheet is ended as described above, the process returns through step S49 to step S47. If there is a next sheet, facsimile transmission is conducted in the same manner as described above. If there is no next sheet, the process returns through step S44 to step S42 in which a next drawing bundle is searched. If there is a next drawing bundle, a sheet which is included in the drawing bundle and has the transmission state of "REQUEST" is transmitted in the same manner as described above. If there is no next drawing bundle, the transmission flow is ended.

The drawing bundle acquisition routine of FIG. 9 will be described. In the drawing bundle acquisition routine, a sheet to be transmitted is acquired from the filing device 201. As described in conjunction with FIG. 8, the routine is called for each drawing bundle.

In the drawing bundle acquisition routine, first, the drawing bundle is retrieved from the filing device 201 with using the identifier of the drawing bundle as a keyword (step S61). On the basis of the configuration information 31 of the drawing list, thereafter, it is judged whether a sheet of the drawing bundle is designated or not (step S62). If no sheet is designated, all sheets included in the drawing bundle obtained as a result of the retrieval are added as designation sheets of the drawing bundle of the configuration information 31 and added to the object list 32, the transmission state of the record of each of the sheets added to the object list 32 is set to be "REQUEST", and the name of a file in which these sheets are stored is recorded (step S63). The routine is then ended. The added sheets are not provided with log information of the transmission state in the transmission log file.

If it is judged in step S62 that a sheet is designated, a designated sheet is searched in step S64, and it is judged whether such a sheet exists or not (step S65). If such a sheet does not exist, the routine is ended. If such a sheet exists, the transmission state of the sheet is checked to see whether it is "REQUEST" or not (step S66). If the transmission state of the sheet is not "REQUEST", the process advances to a next sheet (steps S67 and S65).

If the transmission state of the sheet is "REQUEST", the set of sheets which are obtained as a result of the retrieval is checked to see whether the questioned sheet is included in the set or not (step S68). If not included, the routine is ended. If included, the name of the file in which the image data of the sheet are stored is recorded (step S69). The process then returns through step S67 to step S65 in which the next sheet is processed in the same manner. When all sheets have been processed, the routine is ended.

The image data conversion routine of FIG. 10 will be described. As described in conjunction with the flowchart of FIG. 8, the routine is called for each sheet which is set to be "REQUEST".

In the image data conversion routine, first, the image data of the sheet are converted into data of Run Length Coding (RLC), and the converted data are stored in a file (step S71). Then, the direction of the image is checked (step S72). When the image is long vertically, the image data are not modified.

When the image is long horizontally, the image data are processed so that the image is rotated by 90 deg., and the processed data are stored (step S73). Then, the RLC-converted image data are clipped so that the image has a size equal to that of the image region of a facsimile sheet, and the data are then stored (step S74). Finally, the data are subjected to a compression process for facsimile transmission, such as MMR, and the compressed data are stored in a file (step S75). Thereafter, the routine is ended.

The image data which are converted as described above into data that can be facsimiled is transferred to the facsimile device, and then stored in the video memory of the device. Thereafter, the data is subjected to facsimile transmission.

Figure 11:
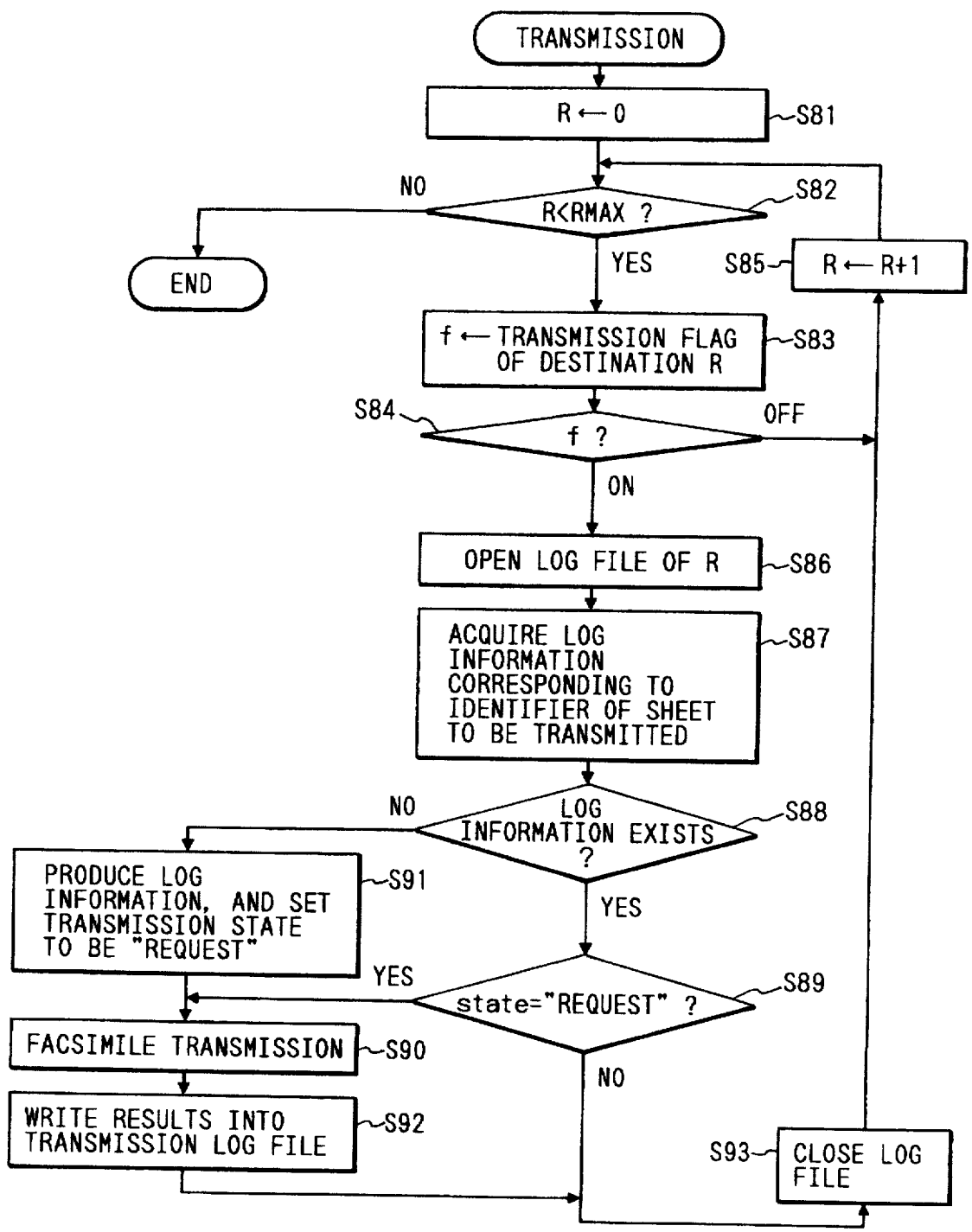
FIG. 11 is a flowchart showing the operation of a facsimile transmission unit used in the example of FIG. 1.

The facsimile transmission routine of FIG. 11 will be described.

In the facsimile transmission routine, the records of destinations R (R=0, 1, 2, . . . , (RMAX-1)) the maximum number of which is RMAX and which are in the destination list 33 are sequentially subjected to the following process.

First, the destination R is initialized to be 0 (step S81). In next step S82, it is judged whether the destination R is smaller than RMAX (R<RMAX) or not. If R≧RMAX, it is judged that the transmission process has been conducted on all of the destinations, and the transmission routine is ended.

If R<RMAX, the transmission flag of the destination R is checked to see whether it is "ON" or "OFF" (steps S83 and S84). If the transmission flag is "OFF", the process returns through step S85 to step S82, and the process for the next destination is then conducted.

In contrast, if the transmission flag of the destination R is "ON", the transmission log file of the destination R is opened (step S86), and log information corresponding to the identifier of the sheet to be transmitted is acquired (step S87). Then, it is judged whether the log information exists or not (step S88).

If the log information exists, it is judged whether the transmission state is "REQUEST" or not (step S89). If "REQUEST", the image data of the sheet is facsimiled (step S90). The results of the transmission, namely information indicating that transmission was completed or failed, and, when transmission is failed, error information indicating the cause of the transmission failure is written into the transmission log file (step S92). Specifically, when transmission was completed, "DONE" is written into the transmission log file, and, when transmission is failed and incompletely ended, "FAILED" is written. Furthermore, also the transmission state of the object list is rewritten.

The transmission log file is then closed (step S93). Thereafter, the process returns through step S85 to step S82, and the process for the next destination is then conducted.

As described above, the sheets added in step S63 of the drawing bundle acquisition routine of FIG. 9 are not provided with log information. Regarding such a sheet, the process advances from step S88 to step S91 in which log information of the sheet is produced and the transmission state is set to be "REQUEST". Then, the process proceeds to step S90 to conduct facsimile transmission in the manner described above, and results of the transmission are written into the transmission log file (step S92). The transmission log file is then closed (step S93), and the process for the next destination is conducted.

When the transmission process for the final destination is ended, the transmission routine is ended. In order to conduct retransmission, the transmission log file and the drawing list into which the transmission results were written are input to the transmission management editing unit 100 as described above. The transmission management editing unit 100 conducts the transmission request process on the transmission log file and the object list of the drawing list in the manner described above.

Figure 12:
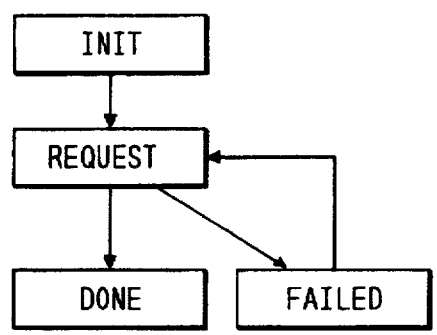
FIG. 12 is a transition diagram of the transmission state of a drawing list and transmission log file used in the embodiment of the invention.

FIG. 12 is a transition diagram of the transmission state of records of the transmission log file and the object list 32. In the figure, "INIT" indicates the transmission state which is obtained immediately after records of the transmission log file and the object list are produced. As seen from FIG. 12, in order to conduct retransmission, the state of "FAILED" is changed to "REQUEST" by the transmission request unit 102.

Figure 13B:
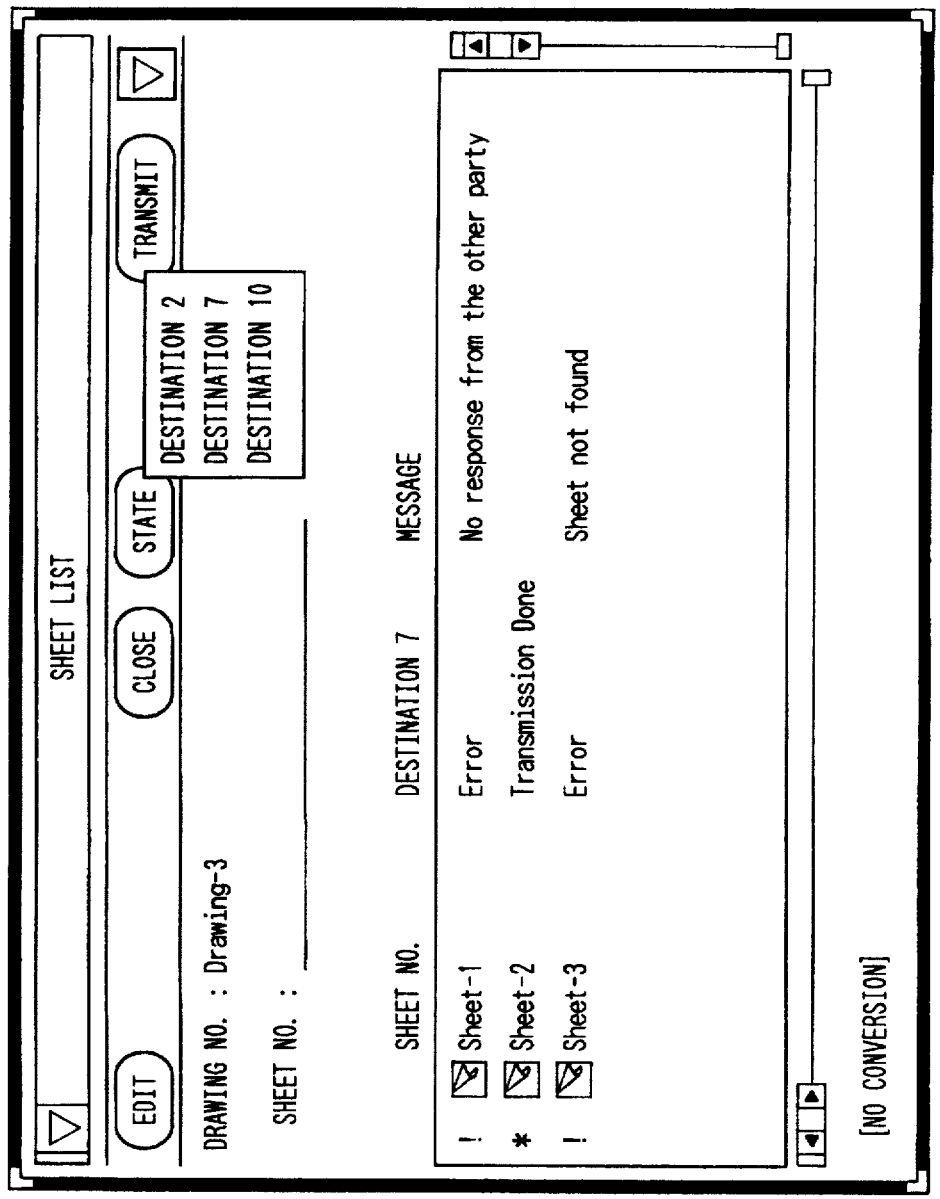

FIGS. 13(A) and 13(B) show examples of a display of operations which can be conducted through the user interface 103 on the transmission list editing unit 101. FIG. 13(A) shows transmission histories of drawing bundles, and FIG. 13(B) those of sheets.

In such a display, as shown in FIG. 13(A), a symbol identifying a transmission result is displayed at the head of each line in the drawing bundle list. The symbol "*" indicates that all sheets included in the pertained drawing bundle were successfully transmitted to all destinations, and the symbol "!" that the pertained drawing bundle includes a sheet or sheets which failed to be transmitted to a destination. In the illustrated examples, "!" is affixed also to a drawing bundle which was designated but does not exist in the filing device, and this fact is displayed in the message column as a reason of the retrieval error.

When the operator selects an arbitrary line of the drawing bundle list in the window screen of FIG. 13(A) and presses a given key of the keyboard, the screen of FIG. 13(B) appears which shows a list of all sheets included in the selected drawing bundle.

A symbol identifying a transmission result is displayed at the head of each line in the sheet list. The symbol "*" indicates that the pertained sheet was successfully transmitted to all destinations, and the symbol "!" that the pertained sheet failed to be transmitted to a destination.

In the window screen of FIG. 13(B), destinations are listed in a [STATE] menu. When an arbitrary one of the destinations is selected by, for example, using a mouse, the transmission results for the selected destination are displayed as illustrated. FIG. 13(B) shows the transmission results for destination No. 7. In the screen, transmission results are displayed in the destination column and detailed error information is displayed in the message column. The detailed error information is produced from error information of the records for each sheet in the transmission log file, and then displayed.

When the [TRANSMISSION] button of the menu line in the window screen of FIG. 13(A) or 13(B) is selected by using a mouse, the transmission request unit 102 is actuated, and the transmission request process is then conducted in the manner described above on a sheet which has not yet been transmitted and that which has incompletely transmitted because of a transmission error. In the window screens shown in FIGS. 13(A) and 13(B), addition, change, and deletion of drawing bundles and sheets can be done on the drawing bundle list and the sheet list.

Figure 14:
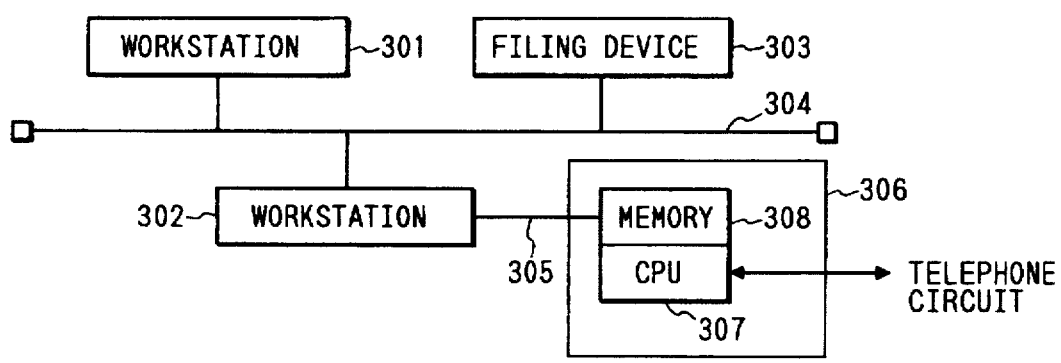
FIG. 14 is a diagram showing an example of a specific configuration of the embodiment of the invention.

FIG. 14 shows an example of the specific configuration of the automatic delivery system according to the invention. In the automatic delivery system of the example, workstations 301 and 302, and a filing device 303 are connected to each other through a LAN 304. A facsimile device 306 is connected to the workstation 302 through a communication line 305 which uses communication interfaces such as RS232C, or SCSI. The facsimile device 306 includes a CPU 307 which manages transmission operations, transmission results and the like, and a memory 308 which stores image data to be transmitted.

The workstation 301 executes the functions of the transmission management editing unit 100 and the delivery execution unit 200 which are shown in FIG. 1, as respective processes.

Image data of a drawing to be transmitted are fetched from the filing device 303 to the workstation 301, and then transferred to the workstation 302 with using a communication protocol such as Remote File Sharing (RFS). The image data are further transferred to the video memory 308 of the facsimile device 306. The facsimile device 306 executes facsimile transmission under the control of the CPU 307. The workstation 302 notifies results of transmission conducted by the facsimile device 306 to the workstation 301 which in turn records the notified results into the transmission log file.

In the example, as described above, the transmission management editing unit 100 and the delivery execution unit 200 are separated from each other in the viewpoint of a process. Therefore, a workstation may be structured in such a manner that the transmission management editing unit 100 is set as a client and the delivery execution unit 200 as a server. In this case, the system may be extended so that transmission requests from plural clients are processed by one server.

In the above, the embodiment in which documents to be transmitted are drawings has been described. However, it is a matter of course that documents to be transmitted are not restricted to drawings. When management of document files or that of transmission is conducted in a hierarchical structure, the number of hierarchy levels may be three or more unlike the embodiment in which the two-level system is used.

In the embodiment described above, after the operator makes the instruction of retransmission, the retransmission request is produced and retransmission is then executed. Alternatively, when an incomplete transmission document exists, the retransmission request may automatically be produced. In this alternative wherein retransmission is automatically conducted, the automatic retransmission may be stopped after retransmission is repeated in a predetermined number of times, and thereafter retransmission is not started until the operator instructs retransmission to be started.

As described above in detail, according to the invention, when documents which are managed in a hierarchical structure are delivered by a facsimile device to destinations indicated in a destination list, transmission management information reflecting transmission results is managed in the hierarchical structure, the transmission management information is updated in accordance with results of each facsimile transmission, and each facsimile transmission is conducted on the basis of the transmission management information including the history of the transmission results. In order to rapidly conduct the retransmission process, therefore, the operator is required only to give a simple instruction without considering transmission results of each document which is a transmission object.

What is claimed is:

1. An automatic facsimile delivery system which uses a facsimile device to deliver documents to destinations indicated in a destination list, each document having a hierarchical structure with at least one upper level object and lower level objects belonging to the one upper level object, said system comprising:

storage means for storing the documents;

transmission management means for producing and managing transmission management information for document delivery in accordance with the destination list, said transmission management information being managed to provide control over transmission of each lower level object of the hierarchical structure of each document;

retrieval means for retrieving a document to be transmitted, from said storage means, on the basis of the transmission management information supplied from said transmission management means;

data conversion means for converting data of the document to be transmitted into a form which can be facsimiled;

facsimile transmission means for transmitting data which have been converted by said data conversion means, to a destination indicated in the destination list;

transmission history production means for producing a transmission history for each lower level object belonging to the one upper level object in each document, in accordance with completion or incompletion of transmission of each such lower level object conducted by said facsimile transmission means, each of said transmission histories being included in the transmission management information; and retransmission means for automatically retransmitting each lower level object in the hierarchial document structure which has been incompletely transmitted, to the indicated destination, on the basis of the transmission management information including the corresponding lower level object transmission history.

2. The facsimile automatic delivery system according to claim 1, wherein said transmission management information includes a transmission history relating to completion and incompletion for each of the destinations with respect to each of the documents which are in a lower hierarchy level.

3. The facsimile automatic delivery system according to claim 1, further comprising means for editing said transmission management information.

\* \* \* \* \*